US012024891B2

(12) United States Patent
Casey

(10) Patent No.: US 12,024,891 B2
(45) Date of Patent: Jul. 2, 2024

(54) EXPOSED STRUCTURE HEATING APPARATUS AND METHODS OF MAKING AND USE

(71) Applicant: Brian T. Casey, Tahoe City, CA (US)

(72) Inventor: Brian T. Casey, Tahoe City, CA (US)

(*) Notice: Subject to any disclaimer, the term of this patent is extended or adjusted under 35 U.S.C. 154(b) by 0 days.

(21) Appl. No.: 17/811,927

(22) Filed: Jul. 12, 2022

(65) Prior Publication Data

US 2023/0175268 A1 Jun. 8, 2023

Related U.S. Application Data

(63) Continuation of application No. 15/988,906, filed on May 24, 2018, now Pat. No. 11,414,870, which is a continuation of application No. 14/589,850, filed on Jan. 5, 2015, now Pat. No. 9,982,438, which is a continuation of application No. 13/272,990, filed on Oct. 13, 2011, now Pat. No. 8,946,601.

(60) Provisional application No. 61/455,088, filed on Oct. 13, 2010.

(51) Int. Cl.
*E04D 13/10* (2006.01)
*H05B 3/06* (2006.01)

(52) U.S. Cl.
CPC ............. *E04D 13/103* (2013.01); *H05B 3/06* (2013.01)

(58) Field of Classification Search
CPC .......... F01D 5/147; F03B 11/002; F03B 3/00; F03B 3/02; F03B 3/121; F03B 11/00; F03B 3/12; Y02E 10/20; E04D 13/103; E04D 13/10; H05B 3/06
See application file for complete search history.

(56) References Cited

U.S. PATENT DOCUMENTS 4,258,703 A * 3/1981 Reitmaier ............... E04D 3/362 126/673
2010/0024324 A1* 2/2010 Meinzer ................ E04D 13/103 165/47

OTHER PUBLICATIONS

Bylin Engineered Systems (Year: 2001).*

* cited by examiner

*Primary Examiner* — Dana Ross
*Assistant Examiner* — Adam M Eckardt
(74) *Attorney, Agent, or Firm* — Holland & Hart LLP

(57) ABSTRACT

An apparatus for heating structure or areas adjacent such structure, such as a roof on a building for example, exposed to varying weather conditions and methods of making and use of the apparatus. The heating apparatus can include a heating element and heat supplying components. In one embodiment, the heating apparatus also includes a heatable cover panel and fasteners or other fastening components or materials for securing the heating element and cover panel to the structure. The heat supplying components may include one or more heater cable or heater cable sections penetrating one or more heater cable channels in the heating element. The apparatus may also utilize various insulating and other materials, including paint on exposed surfaces of the apparatus.

20 Claims, 6 Drawing Sheets

EXPOSED STRUCTURE HEATING APPARATUS AND METHODS OF MAKING AND USE

CROSS-REFERENCE TO RELATED APPLICATIONS

This application is a continuation of US patent application entitled "EXPOSED STRUCTURE HEATING APPARATUS AND METHODS OF MAKING AND USE," Ser. No. 15/988,906, filed May 24, 2018, which claims priority through the applicant's prior US patent application entitled "EXPOSED STRUCTURE HEATING APPARATUS AND METHODS OF MAKING AND USE," Ser. No. 14/589,850, filed Jan. 5, 2015, which claims priority through the applicant's prior US patent application entitled "EXPOSED STRUCTURE HEATING APPARATUS AND METHODS OF MAKING AND USE", Ser. No. 13/272,990, filed Oct. 13, 2011, which claims priority through the applicant's prior provisional patent application, entitled "ROOF DE-ICING APPARATUS AND METHOD OF USE", Ser. No. 61/455,088, filed Oct. 13, 2010, which provisional application is hereby incorporated by reference in its entirety. The present application also incorporates by reference in its entirety the applicant's prior nonprovisional patent application, entitled "HEATING SYSTEM AND METHOD OF MAKING AND USE", Ser. No. 13/211,175, filed Aug. 16, 2011. It is to be understood, however, that in the event of any inconsistency between this specification and any information incorporated by reference in this specification, this specification shall govern.

FIELD OF TECHNOLOGY

The technology of the present application relates to heating apparatus for use on exposed structure and methods of making and use. In one particular embodiment, the technology of the present application relates to apparatus for reducing the formation of, or promoting of melting of, snow or ice on or adjacent a roof, along with methods of making and using such apparatus.

BACKGROUND

In many parts of the country, winter-like conditions deposit or form snow and ice on structures, such as roofs of buildings. As a result, snow and ice can pile up on a variety of structures, including roof eaves and intersecting valley areas of roofs. The accumulated volume and weight of ice and snow can cause serious, costly damage to the roofing and other structures.

In addition, as snow and ice melt (typically during the daytime), the resulting flow or dripping of water down or from the roof can form a wide variety of dangerous icicles and ice structures as temperatures later drop (typically in the evening and at night). The resulting icicles and ice structures often fall off the roof or other structure and cause serious damage to property as well as humans and animals.

Often, ice dams forms along roof eaves and intersecting valley areas. Such ice dams can form when: (1) snow accumulates on a roof; (2) heat escapes from the building's interior and melts accumulated snow; and (3) outside ambient temperatures are below freezing, which can cause the melting snow from the heated area to re-freeze along a cold overhang of the roof.

Ice dams can cause a wide variety of serious problems. For example, they can create standing water conditions above the ice dam at a roof overhang. This standing water can cause a variety of types of damage, whether due to weight of the water on the roof or water leakage into the structure or by sliding off of the roof.

These serious and dangerous problems obviously have existed for a very long time. A variety of electrical systems have been developed in the past to try to solve them.

In one prior art electrical system, a heat generating cable is placed along the roof edge, valleys, and other locations. Commonly, the cable is laid in a zig-zag configuration and is exposed and visible on the roof top. With such systems, much of the drip edge area remains unheated and can accumulate dangerous icicles and ice formations. Further, the cable is exposed to the elements, thus leading to ultraviolet degradation of the cable over time. The cable also typically is secured to the roofing by clips that are in turn fastened to the roofing by fasteners penetrating the roof. Commonly, these fasteners are also exposed, creating the risk of leaks. Heater cable can often be stripped off the roof by high winds or sliding snow.

One prior art system, the Bylin RIM System, consists of a single aluminum heating element mounted to a roof edge and a metal panel cover mounted over the top of the heating element. One lateral side of the heating element abuts and surrounds to some degree the roof edge, and the panel cover typically surrounds heating element, including a portion of the lateral side of the heating element surrounding the roof edge. The panel cover then extends upwardly across and in contact with the upper sides of the heating element and past the heating element upwardly along the roof. The upper portion of the panel cover extending upwardly along the roof is commonly secured to the roof by (i) mounting the upper panel portion on a section of the roof to be further covered by roof structure such as shingles, (ii) securing upper panel portion in place with fasteners penetrating the upper portion and roof support structure below, and (iii) then covering the upper panel portion by mounting shingles over it. A heating cable is mounted in serpentine fashion within three cable passages running along the entire length of the heating element. Thus the three lengths of heating cable heat the aluminum heating element, which in turn heats the panel cover to melt ice and snow in contact with cover.

The applicant has discovered and believes that the heating element of the Bylin RIM System presents a number of problems. They include, for example, that its heating element consists of two relatively thin, planar upper panel support and contact sections spanning between three spaced-apart heating cable channels extending downwardly from the upper panel support sections, and the downwardly extending channels also include, at their lower ends, planar roof contacting sections extending laterally from the lower ends. The relatively thin upper panel support sections, which span across the top of the heating element, can unduly warp, provide insufficient support to, and less than optimal contact with, the upper cover panel cover, and also insufficiently transfer heat through these sections to the upper cover panel. Also, the planar roof contacting sections provide heat loss by consuming heat themselves and also transferring heat to the supporting roof structure in contact with these planar roof contacting sections. In addition, this system provides less than possible heat transfer to its lower edge, which also is in contact with and intended to heat the lower edge of the upper cover panel surrounding that edge to a substantial degree. Further, by providing so much contact between the heating element and underlying roof structure, this system can cause water and humidity to build up in that contact area over time, leading to various problems such as dry rot of adjacent roof materials and corrosion or loosening of the roof attachment fasteners securing the heating element fasteners to the roof.

In another somewhat similar prior art system, by Thermal Technologies, includes a sizeable aluminum heating element that has both a substantial top and a substantial bottom section. The bottom section is secured to the roof by fasteners. The top section has two downwardly extending arms that clip within mating upwardly facing slots along the length of the bottom section. The top and bottom sections cooperatively provide four heating cable passages. Two of the passages are sized to accept one size of heating cable. The other two passages are adapted to accept a differing size of heating cable.

The applicant has discovered and believes that the Thermal Technologies system presents a number of problems too. For example, it is heavy and material intensive, which not only requires excess material costs but also adds weight to the structure and stress on associated supporting structures. Also, when heater cable is mounted within it, its upper and lower heating element sections are spaced apart by the heater cable, and this leads to substantially reduced, or at least less than optimal, heat transfer from the heater cable to and across the upper heating element section as well as to the portions of the lower heating element section that contact the upper cover panel. In addition, the lower heating element section of this system has a large lower surface in contact with the underlying roof structure, causing heat loss by heating of this structure as well as by heat transfer to that contacting underlying roof structure. Further, this system also provides less than possible and desired heat transfer to its lower edge, which also is in contact with and intended to heat the lower edge of the upper cover panel surrounding that edge to a substantial degree.

Other problems with this system include, for example, its upwardly facing slots, into and through which water can leak and debris can accumulate, which can cool the heating element, reduce its heat transfer efficiency, and cause accelerated rotting of the heating cable. Similarly, by providing so much contact between the heating element and underlying roof structure, this system can cause water and humidity to build up in that contact area over time, leading to various problems such as dry rot of adjacent roof materials and corrosion or loosening of the roof attachment fasteners securing the heating element fasteners to the roof.

BRIEF SUMMARY OF SOME ASPECTS OF THE DISCLOSURE

There are a variety of aspects of the present disclosure. In one aspect, the applicant has provided an exposed structure, and for example roof, heating apparatus including a heating element for mounting on a roof that has a relatively larger upper heat transfer section or a relatively smaller lower roof contacting section, or both. In some embodiments, the heating element provides reduced exposure to water or debris penetrating heating element structure and areas between the heating element and an underlying or adjacent roof structure. In certain embodiments, the heating element is adapted to be mounted adjacent, and generate heat, at the edge of roof; and is some of these embodiments, the heating element provides more effective heat transfer to the roof edge and/or support to an upper cover panel that may abut the heating element at or adjacent the roof edge.

Thus, in some embodiments, the heating element mounts to a roof and underlies an upper cover panel or section. In some embodiments, the upper cover panel generally surrounds and abuts upwardly and laterally exposed portions of the heating element. In some embodiments, the upper cover panel may also cover other structure as desired, such as heating cables or other heating components that may be present in or used with the apparatus.

In some embodiments, the heating element may be mounted in place with 1, 2, or 3 heating cable sections penetrating the heating element. In some embodiments, the heating element may include yet additional or fewer heating cable channels as desired.

In some embodiments, the heating element is securable to an underlying roof by fastener that penetrates the heating element but with the surrounding heating element lower surface (that surrounding the fastener) spaced from the underlying roof.

In certain embodiments, the heating element provides heat transfer abutting contact or other direct heat transfer communication between the various adjacent sections of the heating element. In some embodiments, including in certain embodiments some of such embodiments, the heating element is a unitary section.

In some embodiments, the heating apparatus includes an metal heating element, and metal upper cover panel, and a heat source. In some embodiments, the heating element is a heater cable. Other heat sources may be utilized, such as hot water.

Similarly, various of the heating apparatus may be combined with a solar or other energy generating system. In the case of a solar system, for example, some embodiments may for example provide to, or utilize from, a heated fluid or other energy from the solar system.

In certain embodiments, the heating element may consist of less material, provide reduced weight as compared to certain prior art system, and/or yield more rigidity and support (e.g., for an upper cover panel) component lift, and/or heat transfer than certain prior art systems.

In some embodiments, the heating apparatus may include liner, paint, or other separating or insulating structure to, in some embodiments, reduce or prevent contact between dissimilar metallic or conductive components, or between the heating apparatus and other structure. In some embodiments, the heating apparatus may include other insulating or supporting components. In certain embodiments, insulating material may be mounted in spaces between the heating element and underlying structure, which may be a roof or other surface. In certain embodiments, insulating material may be mounted between the upper cover panel and roof or other structure.

In some instances, exposed portions of the heating apparatus as installed may be painted. Metallic paint may also be used on, for example, the upper or exposed surface of the cover panel.

In this regard, it is to be understood that embodiments of the heating apparatus may be mounted to or adjacent roof structure. The heating apparatus may also be mounted to or adjacent other structure or physical material, and in such case the reference to a “roof” in this specification would mean or include such other structure of physical material.

In certain embodiments, the heating apparatus may include additional features. One such feature is additional heating cable or other heat source for extension into, adjacent, or abutting other structure, such as, in some instances, a gutter or roof valley. Another such feature includes flashing or other panel or heating element structure for extension into, adjacent, or abutting other structure.

There a variety of methods of use provided by the various structures disclosed in this application. In some embodiments, the method can include:

1. mounting a heating element to a roof, in some instances adjacent and surrounding somewhat a roof edge; and
2. connecting the heating element to a heat source, and in certain embodiments, mounting the heat source, in some embodiments a heater cable, in mating passages in the heating element; and also in certain embodiments:
3. mounting a cover panel to generally surround the heating element, and in some embodiments, extend over portions of the roof or otherwise beyond contact with the heating element.

In some embodiments, the heating apparatus can provide one or more of a more robust, more efficient, or easier to manufacture, transport, install, or maintain heating apparatus or aspect of such an apparatus. In some embodiments, the heating apparatus can also or in the alternative cost much less to manufacture, transport, install, operate, and maintain.

In some embodiments, the heating apparatus (1) conducts heat from self regulating heater cable(s) most efficiently to the top surface of the apparatus to melt ice and snow; and/or (2) conducts heat from the heater cable(s) more efficiently to the drip edge of the device to melt ice and snow; and/or (3) reduces heat loss by reducing the surface area that bears on the roof.

In some embodiments, the heating apparatus can utilize from 10 to 33% less energy than prior heating apparatus, such as heating element, heating cable, and heat panel cover structures described in the Background section above. In some instances, the heating element provide more heat transfer material mass, which in some embodiments can conduct the heat where it is needed, and, in turn, reduce heat loss in locations where it is not needed.

It is to be understood that this Brief Summary recites some aspects of the present disclosure, but there are other novel and advantageous aspects. They will become apparent as this specification proceeds.

It is also to be understood that aspects of the present disclosure may not necessarily address one or all of the issues noted in the Background above. The scope of the present invention is thus to be determined by the claims as issued and not whether they address issues noted on the Background or provide features recited in this Brief Summary.

BRIEF DESCRIPTION OF THE DRAWINGS

The preferred and other embodiments are shown in the accompanying drawings in which.

DETAILED DESCRIPTION OF THE PREFERRED AND OTHER EMBODIMENTS

Heating apparatus and methods of use are described. Although the heating apparatus is described primarily in the context of the roof structure shown, it should be appreciated that the referenced structure, concepts, and features may be used in a variety of other settings or structures that would be recognized by those of ordinary skill in the art. Also, it should be understood, that the features, advantages, characteristics, etc., of one embodiment may be applied to any other embodiment to form an additional embodiment unless noted otherwise.

Figure 1A:
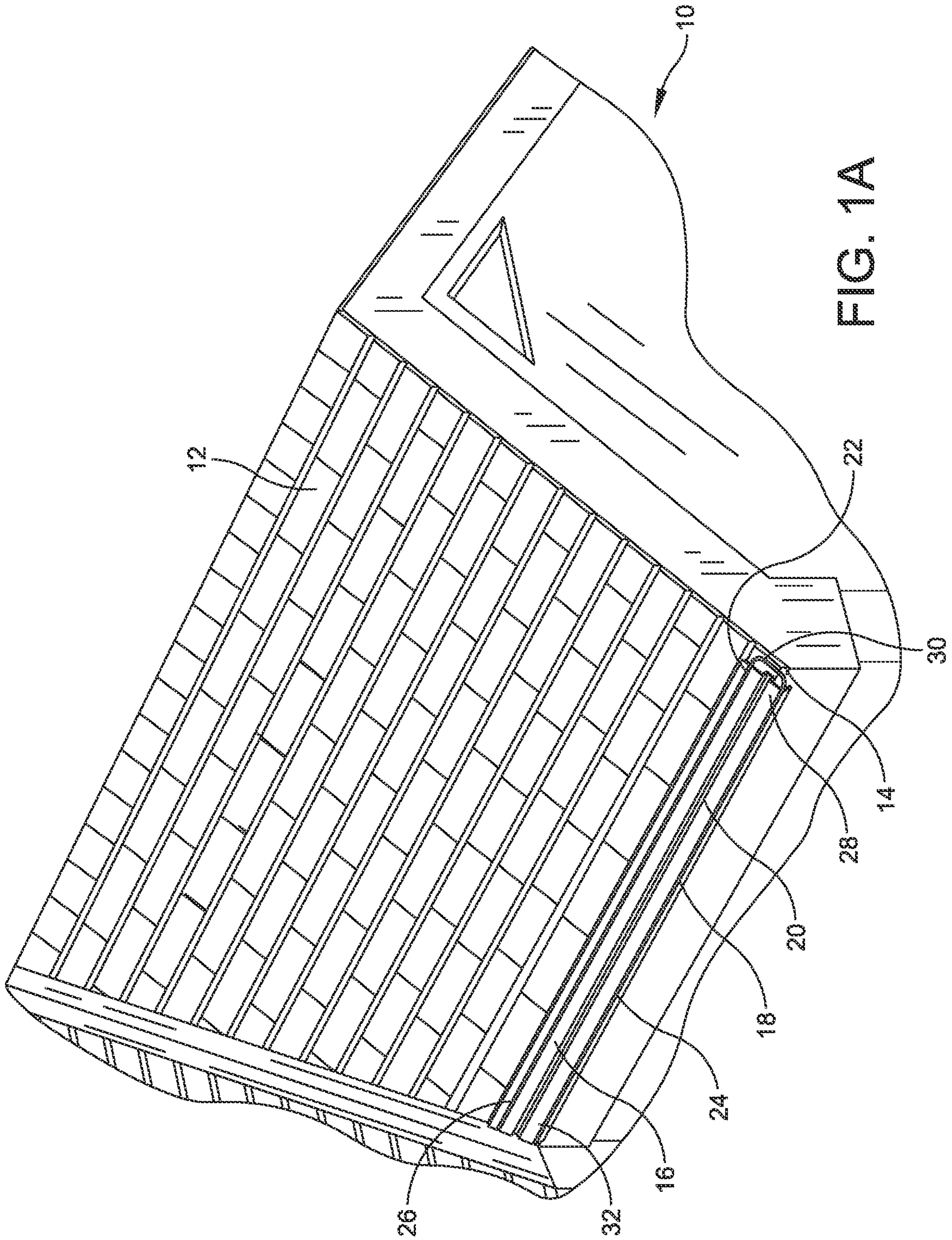
FIG. 1A is a perspective view of a sloped roof on a building with an embodiment of the applicant's heating element mounted to surround the edge of the roof and having two heater cable sections running through the length of the heating element.

With reference now to FIG. 1A, one embodiment of a building, generally 10, has a sloped roof 12 with a lower roof edge 14 extending along the lower most portion of the roof 10. A laterally extending heating element 16 is mounted along the lower roof edge 14. The heating element has three parallel, laterally extending heater cable channels 18, 20, 22. The two outer heater cable channels 18, 22 have heater cable sections 24, 26, respectively, mounted within and penetrating the outer heater cable channels 18, 22, respectively, along their entire lateral length. At the one end 28 of the of the heating element 16 a C-shaped heater cable section 30 spans between and interconnects the two outer heater cable sections 18, 22. At the opposite end 32 of the heating element 16 a power supply heater cable section (not shown and well known in the art) extends outwardly from the heating element and toward connections to a power supply (not shown) in a fashion well known in the art.

The power supply heater cable section, heater cable sections 18, 22, and C-shaped heater cable section 30 can be formed of one continuous heater cable. Such cable can consist of Tyco Thermal's GM-1X or GM-2X self regulating heater cable with an output of up to 12 watts per foot.

The power supply (not shown) is a 110V or 208-277V electrical circuit, typically connected in an electrical junction box is attached to the heater cable in a fashion well known in the art. Similarly, the heater cable is terminated at its end opposite the power supply in a fashion well known in the art.

The heating element 16 may be made of any material that can transfer heat generated by the heater cable section. Some such materials include various metals, alloys, etc. One such metal is copper and another is mill finish 6063 aluminum alloy. In some embodiments, the heating element 16 is formed by extrusion, although any other suitable forming techniques may be utilized.

The two-heater-cable-section system of FIG. 1A can be effective in most winter conditions experiences in most of the United States, such as for example in Lake Tahoe, California. In locations subject to more severe winter conditions, however, the heating-element-and-cabling-structure of FIG. 1B can provide a more reliable solution.

Figure 1B:
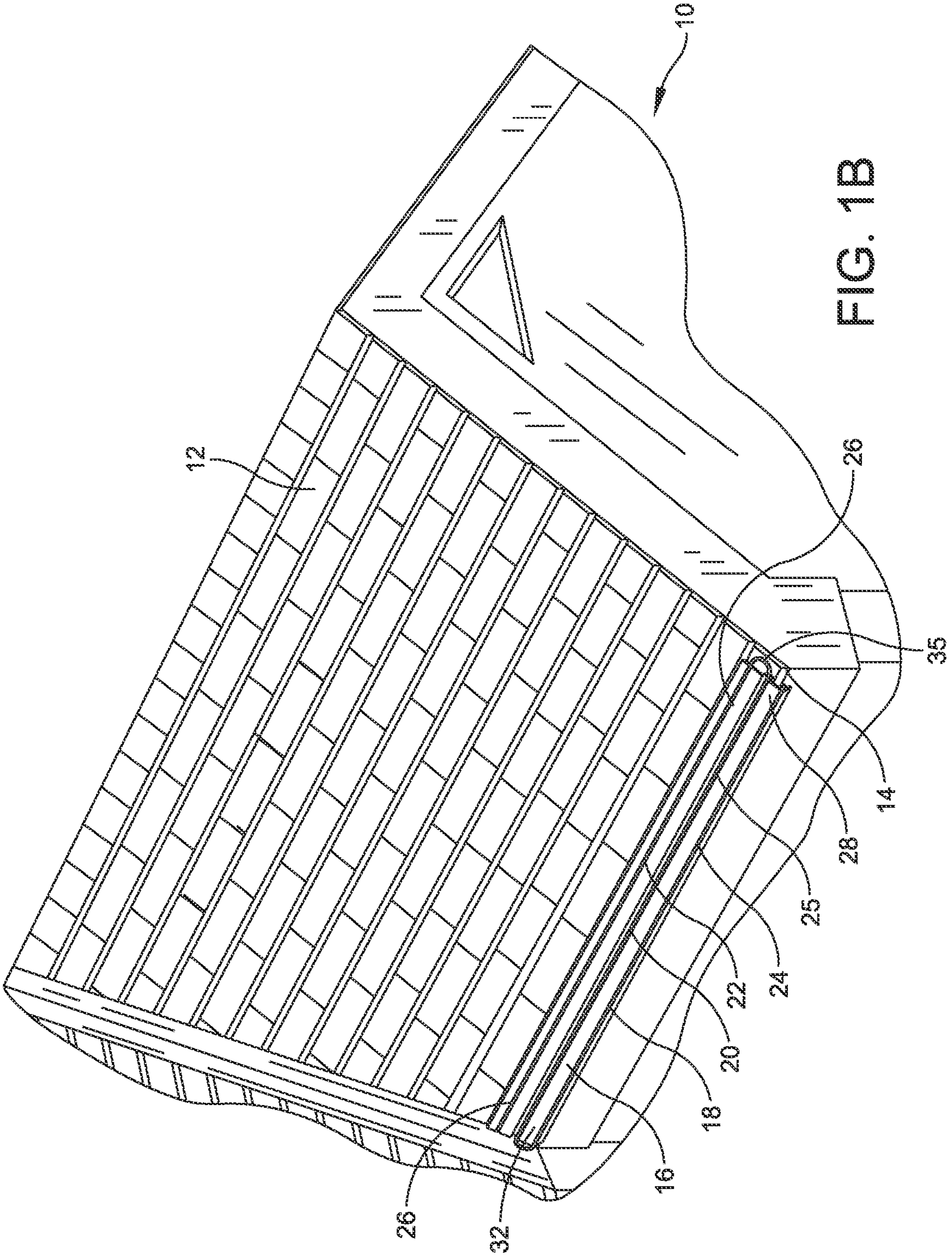
FIG. 1B is a perspective view of a sloped roof on a building with the embodiment of the applicant's heating element shown in FIG. 1 mounted to the roof but with three rather than two heater cable sections running through the length of the heating element.

Referring now to FIG. 1B, a third, central heater cable section or run 25 penetrates the central heater cable channel 20 intermediate the two opposed outer heater cable channels 18, 22 and their associated two cable sections or runs 24, 26 respectively. A relatively smaller C-shaped heater cable section 35 extends from the one heating element end 28 and interconnects the central heater cable section 25 and an outer heater cable section 26. With the same type of heating element 16, heater cabling, e.g., 26, and power supply, the three-heater-cable-section apparatus of FIG. 1B can provide a higher level of heat in the heating element 16 all other things being equal. Thus, this structure can work effectively many of the more severe winter weather locations in the U.S. to adequately heat a roof, e.g, 12, and associated roof edge, e.g., 14, to prevent snow, ice, and icicles from accumulating in the vicinity of the heating element 16.

Figure 2A:
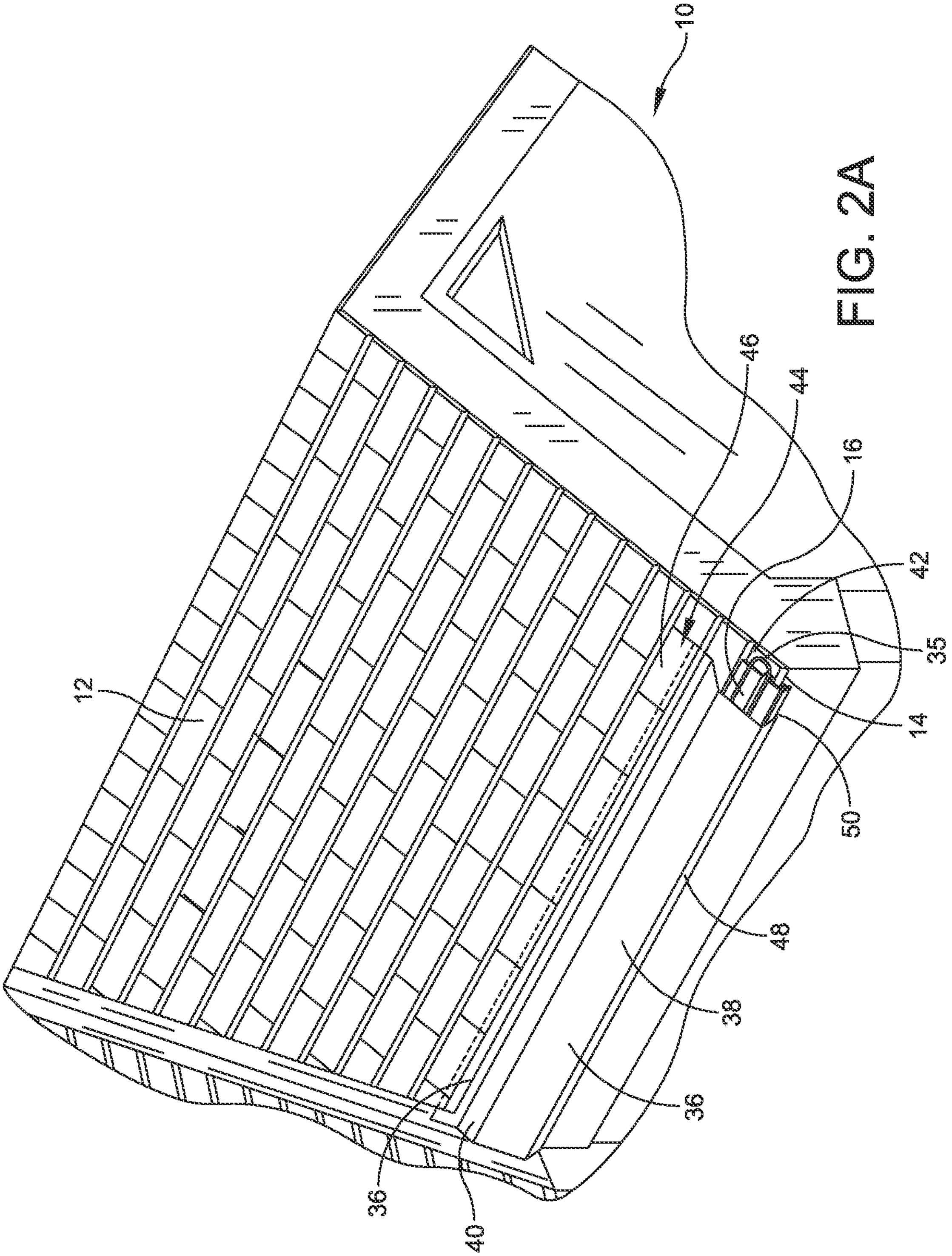
FIG. 2A is a perspective view of the heating element of FIG. 1B having an upper panel cover mounted to cover most of the heating element and heater cable extending through the heating element.

With reference now to FIG. 2A, a cover panel 36 is mounted on top of the heating element 16. The cover panel 36 has a planar heating element cover section 38, and an intermediate planar angled section 40 interconnecting, and at an angle to, the heating element cover section 38 and upwardly extending section 37. The upwardly extending section 37 abuts an underlying roof surface 42 on which the heating element 16 is also mounted. The upper end 44 penetrates under a row of roof shingles, generally 46, above the heating element 16 on the roof 12. The lower end 48 of the cover panel 36 surrounds and abuts the lower edge 50 of the heating element 16.

The cover panel 36 can be formed of any suitable material that will cover and protect the underlying heating element 16 and associated heater cable, e.g., 24, 26, 28, and heat-up due to heat transfer from the heating element 16 to the cover panel 36. Such cover panel material may be or include suitable metal or metal alloy, and one embodiment of the cover panel 36 may consist of twenty (20) ounce per square foot copper sheet pre-formed into the shape as mounted on to the heating element 16 and the roof surface 42.

Figure 2B:
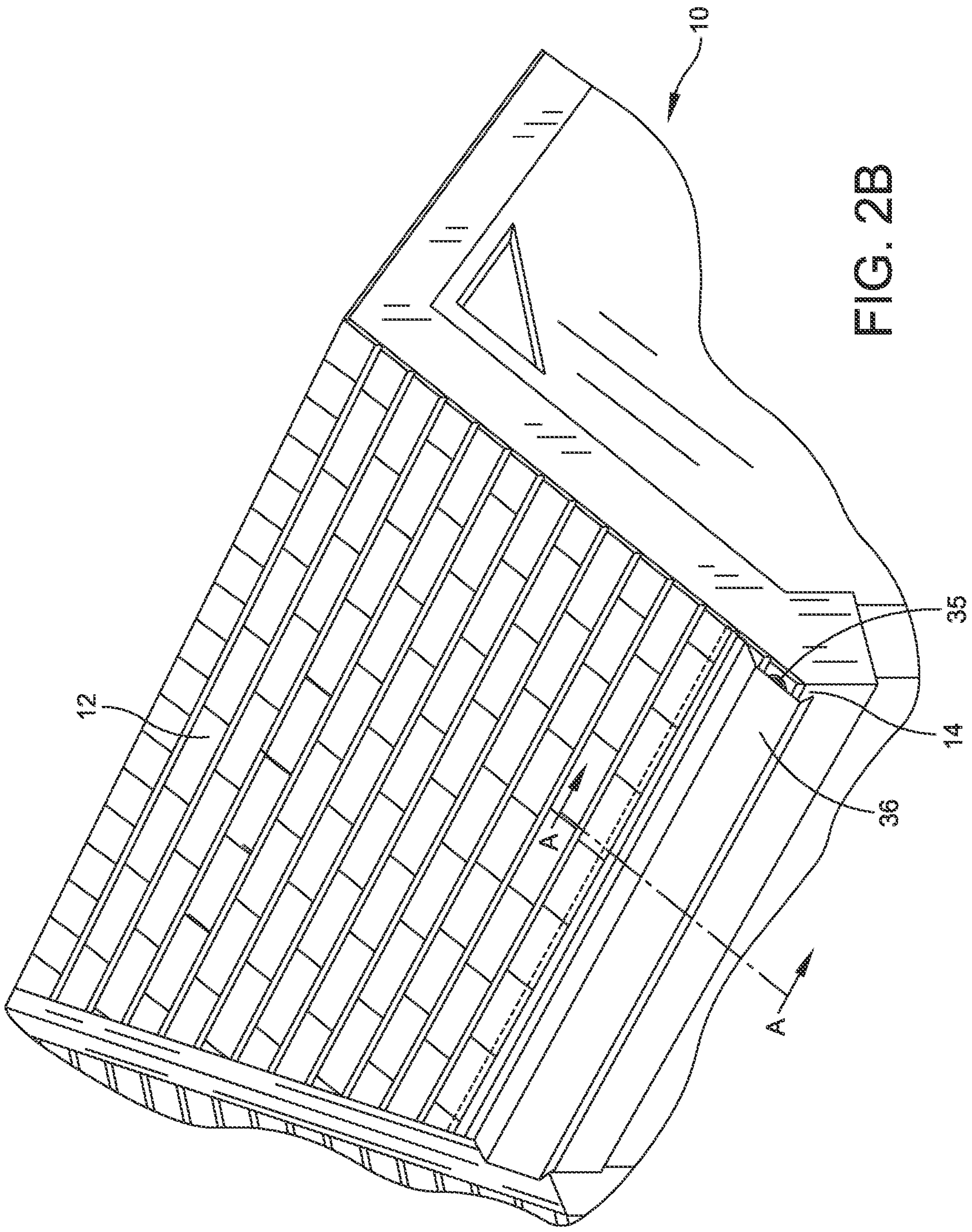
FIG. 2B is a perspective view of the heating element of FIG. 1B with an upper panel cover mounted to cover the entire heating element and heater cable extending from the right side end of the heating element.

Turning now to FIG. 2B, when fully assembled on a roof 12, the cover panel 36 can, if desired, cover the entire upper surfaces of the entire heating element (not shown in FIG. 2B) and cable sections (id.) running through the heating element as well as the C-shaped interconnecting cable section 35 at one end of the heating element (id.).

Figure 3:
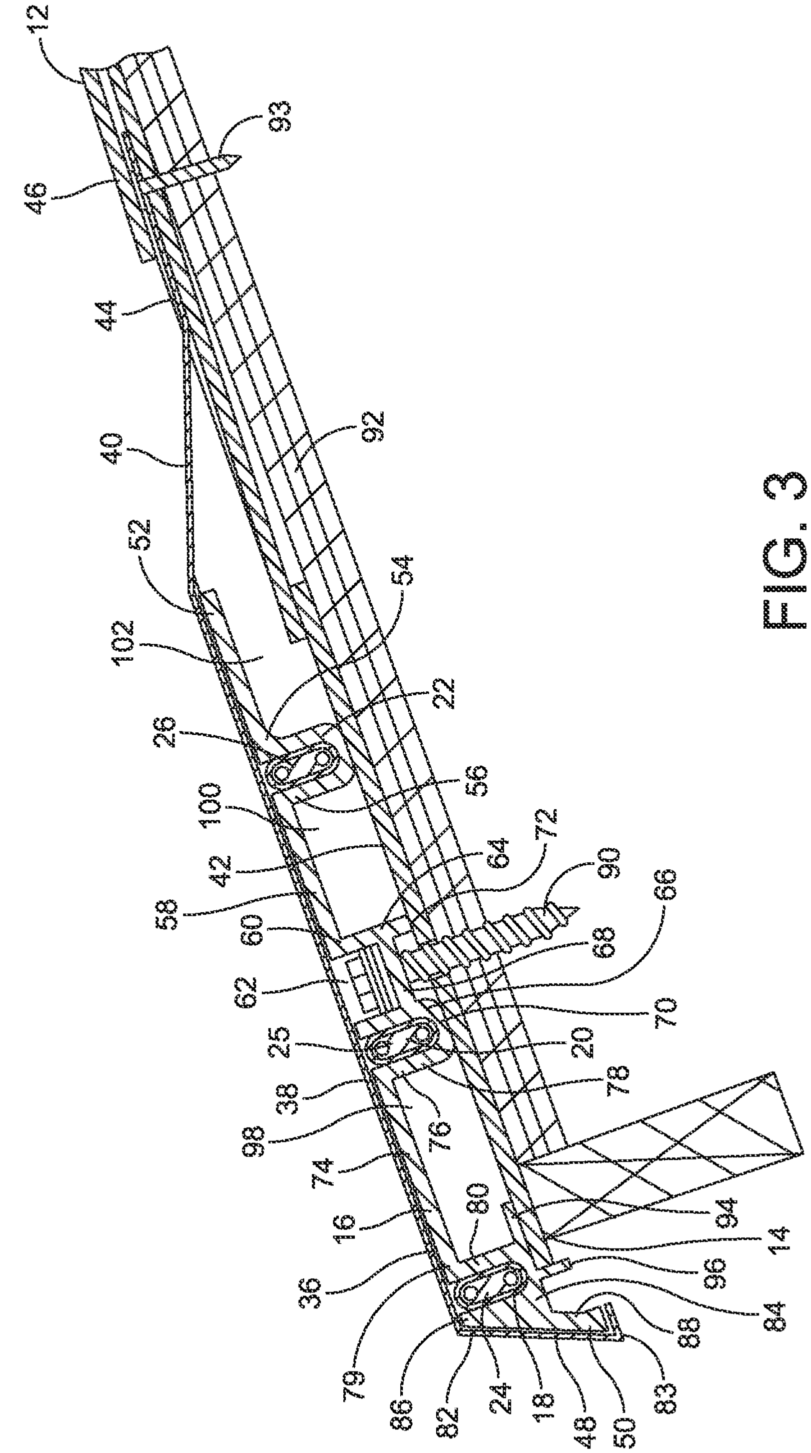
FIG. 3 is a partial cross-sectional view taken along section line A-A of FIG. 2B.

Referring next to FIG. 3, each heater cable channel, e.g., 18, has U-shaped cross-section sized to surround and abut, by firm friction fit, an associated heater cable section, e.g., 24, when in position in the heating element 18. It is to understood that the U-shaped heater cable channel, e.g., 18, is so conformed to mate with the associated heater cable section, e.g, 24, and the heater cable channel 18 may have other shapes and sizes to work with other cable shapes or other types of heat supply vehicles.

In one such embodiment, the heating element 16 may have one or more tubular passages (not shown) rather than, or in addition to, the U-shaped heater channels, e.g., 18. In an embodiment, such a tubular passage may be utilized to transport, e.g., heating fluid or other material (not shown) through the heating element 16. In other embodiments, the heating element 16 can include fewer or more heating channels or passages, depending on the application.

With continuing reference to FIG. 3, an upper planar panel support and heat transfer arm 52 extends transversely from the upper edge 54 of the upper outer heater channel 22 and parallel to the heating element cover section 38 of the cover panel 36. A central planar panel support and heat transfer section 58 extends from the lower edge 56 of the upper outer heater channel 22 coplanar with the upper heat transfer arm 52. The lower edge 60 of the central heat transfer section 58 terminates at a junction with a fastener channel 62 extending along the lateral length of the heating element 16 parallel to and spaced from the outer heater channel 22.

The fastener channel 62 is formed by: (i) an upper vertical support arm 64 extending perpendicularly downwardly from the lower edge 60 of the central heat transfer section 58; (ii) an opposing lower J-shaped support arm 66 provided by the upper section of the central heater cable channel 25; and (iii) an interconnecting planar fastener penetrating and support section 68 spanning (a) transversely between the upper vertical support arm 64 and opposing lower J-shaped support arm 66 and (b) spaced substantially from the ends 70, 72 of the lower J-shaped support arm 66 and the upper vertical support arm 64, respectively. The cross-section of the fastener channel 62 is thus generally H-shaped.

A lower planar support and heat transfer section 74 extends transversely from the upper end 76 of the lower arm 78 of the central heater cable channel 25. The lower planar heat transfer section 74 is coplanar with the central planar heat transfer section 58. The lower end 79 of the lower planar heat transfer section 74 is coterminous with the upper arm 80 of the U-shaped lower outer heater cable channel 18. The upper arm 80 is opposite the lower arm section 86 of the lower outer heater cable channel 18, and this upper arm 80 also provides, on the side of that arm 80 opposite the lower outer heater cable channel 18, the lower edge 50 of the heating element 16. The lower edge 50 includes a sloped outer substantially planar surface 82 extending downwardly past the lower roof edge 14 at an angle to the plane of the lower planar heat transfer section 74. The sloped outer surface 82 yields a continuous and thickened section 84 spanning from the sloped outer surface 82 to co-terminate in (as part of) the lower arm 86 of the lower outer cable channel 18.

A lower edge lip 88 extends downwardly from the thickened section 84 along with, and as part of and providing, the sloped outer surface 82. The lower edge lip 88 extends below the level of the lower roof edge 14.

A relatively small planar roof surface mounting support arm 94 extends from the bottom of the lower outer heater cable channel 18 parallel to the lower planar heat transfer section 74. In addition, a relatively small planar edge locating arm 96 extends downwardly from the bottom of the lower outer heater cable channel 18 perpendicularly to the plane of the roof surface mounting support arm 94.

Screw fasteners, e.g., 90, penetrate mating passages spaced apart along the lateral length of the fastener support section 68. The screw fasteners, e.g., 90, penetrate into the rigid and secure underlying roof structure 92 to thereby also secure the heating element in position with respect to the roof edge 14. The screw fasteners, e.g., 90, may include a rubber or other insulating washer to reduce or eliminate contact between the screw and the fastener support section 68. This can reduce or eliminate electrolysis between the screw, e.g., 90, and the heating element 16 if composed of dissimilar metals.

In some embodiments, the roof 12 may include differing structure, such as a roof membrane on or adjacent the upper surface of the roof. The H-shaped fastener channel 62 also prevents any burrs, often caused by pre-drilling a fastener passage (not shown) in the fastener channel 62, from damaging the membrane during installation and use of the heating element 16. The fastener passage also can be pre-drilled to be over-sized as compared to the width of the screw or other fastener. This can allow expansion and contraction of the heating apparatus caused by thermal changes over time during us.

The H-shaped fastener channel 62 may be formed to have differing shapes. For example, in some embodiments the fastener channel 62 may have a U-shape, and the bottom of the U-shaped channel 62 may contact the upper surface of the roof 12 when desired, such as to add additional support by the heating element 16 of the cover panel 16.

The cover panel 36 lower end 48 extends downwardly from the heating element cover section 38 to abut the sloped planar outer surface 82 of the heating element 16 as well as to wrap around and abut the bottom planar surface 83 of the lower edge arm 88. The bottom planar surface 8. of the lower edge arm 88 is parallel to, and spaced downwardly from, the plane of the roof surface mounting support art 94.

Nails, e.g., 93, are nailed through the upper end 44 of the upwardly extending section 37 of the cover panel 16 to securely penetrate underlying roofing support structure 92 along the lateral length of the upwardly extending section 37. In some embodiments, such as that shown in FIG. 3, the nails, e.g., 93, and associated upper end 44 of the upwardly extending section 37 underlie a covering row of roof shingles, e.g., 46.

The cover panel 36 thus surrounds, and helps protect from the elements and debris, the entire otherwise exposed portions of the heating element 16, the heater cable sections, e.g., 24, mounted in the heating element 16, and the screw fasteners, e.g., 90. At the same time in the embodiment shown, the heating element 16 provides relatively minimal material in contact with the roof 12 or other non-cover-panel structure while providing relatively maximal support and heat transfer contact between the cover panel 36 and (i) the supporting and heat transfer sections 74, 58, 52 and (ii) the lower edge 50 structure of the heating element.

In the embodiment of FIG. 3, the relatively minimal heating element 16 contact with the roof 12 is provided only by (i) the bottom surface of the three cable channels 18, 20, 22, (ii) the upper vertical support arm 64 of the fastener support section 68, and (ii) the adjoining roof surface mating support arm 94 and the transversely extending edge locating arm 96. Even less surface contact may be provided by reducing the size of or eliminating the roof surface mating support arm 94 and/or the edge locating arm 96.

Figure 4:
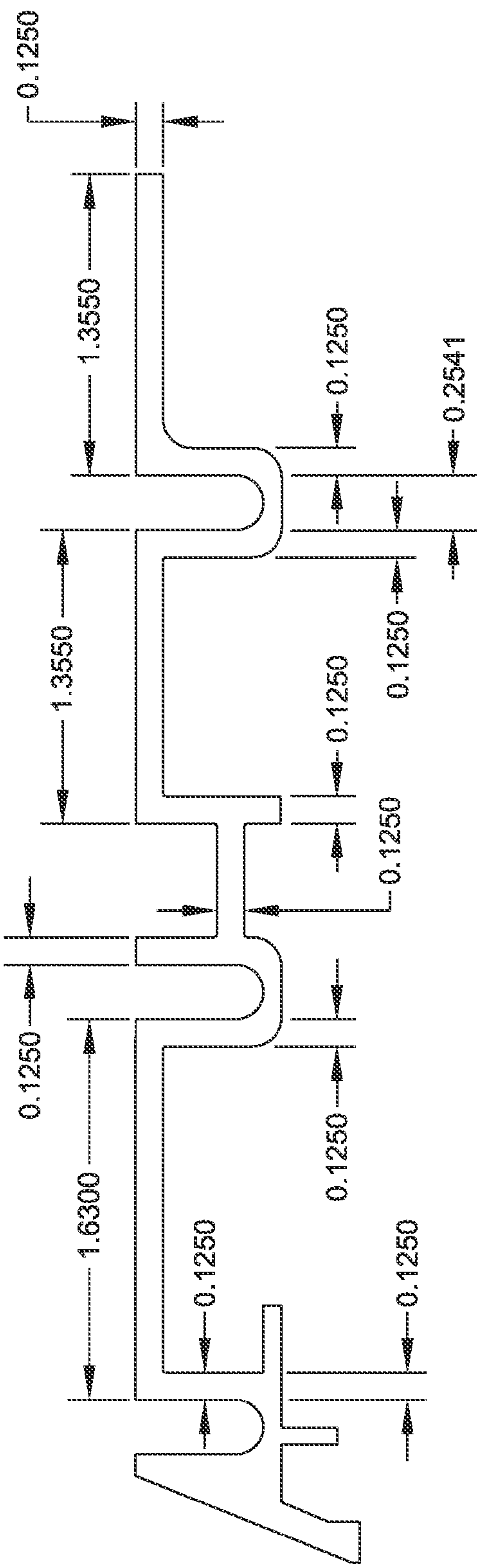
FIG. 4 is a cross-sectional view of the heating element shown in FIG. 3 also showing dimensions of one embodiment of the heating element.

The dimensions of one embodiment of heating element 16 are shown in FIG. 4 in inches. These dimensions may be up to 60% less, preferably only 40% less, than these dimensions and 400% greater, but preferably only 100% greater, than these dimensions in most applications. In heavier duty applications, the dimensions may be even larger.

As compared to the Bylin prior system explained above, the embodiment of FIG. 4 provides: (i) 45% more heating top surface area on the cover panel 36; (ii) 72% less convective contact area between the heating element and supporting roof structure; (iii) 86% more convective contact area between the heating element and mating sections of the cover panel 36. Lesser percentages may also be achieved by differing designs; greater percentages may be achieved too, such as, for example, by deletion of a central heater cable passage structure.

The weight of the FIG. 4 embodiment of the heating element 16 is 1.334 lbs. per linear foot. The weight of the cover panel 36 shown in FIG. 3, with the heating element 16 of FIG. 4, is 0.8 lbs (if aluminum) or 1.7 lbs. (if copper) per linear foot.

Insulation or other materials may be utilized in conjunction with the FIG. 3 or other embodiments. For example, insulating foam may be injected in one or more channels 98, 100, 102 formed by the heating element and roof 12. Such insulation can help reduce heat loss from the heating element to moisture and surrounding air and airflow within these channels 98, 100, 102 depending on the particular structures utilized in or with the heating apparatus system. Certain types of insulation can also provide further support to the heating element 16 and, in turn, the cover panel 36. In some embodiments, the insulation may be preformed and mounted in or secured to the associated heating element portions yielding such channels 98, 100, 102.

Insulating plastic liners, paint, or other layering (no shown) may be mounted, inserted, or sprayed on one or more surfaces of the heating apparatus. For example, such insulating layers can be located between one or more mating sections of, e.g., a copper cover panel 36 and, e.g., aluminum heating element 16, or between any other structures made of disparate metals or otherwise benefitting for any such liner or layer. Use of an insulating layer can reduce corrosion as well as help seal interior heating apparatus structure from exposure to humidity, water, debris, etc.

The heating apparatus can be utilized with other heating structure(s). For example, multiple heating elements and cover panels may be utilized as necessary to facilitate given objectives, such as size concerns in shipping. Additional heater cable section may be included to extend the heating cable into other structures, such as gutters and along roof valleys. Additional covers may be utilized such as copper cover panels of varying shapes such as might be utilized to cover a heating cable in a given location, such as a roof valley.

With regard to the embodiment of FIG. 3, the various heater cable channels and fastener support channel may be placed in differing locations while maintaining the objective of relatively maximizing heat transfer contact between the cover panel and heating element and relatively minimizing heat transfer contact between the heating element and supporting structure like an upper roof surface.

Differing cover panel shapes may be utilized. For example, the cover panel may be larger to extend further upward on a roof from its lower edge. The lateral ends of the cover panel, at one or both ends of the heating element. may include extension portions that can be bent in position to surround and seal from the elements the heating element and/or associated heater cabling. In the alternative or in addition, other metal sheeting or cap structure may be mounted to or surrounding exposed or unsealed portions of either of the opposed lateral ends of the heating panel to seal the heating element or associated heater cable from the elements or debris.

In one exemplary embodiment, the heating apparatus may be assembled as follows:

1. mounting and securing the heating element to a roof either to a roof deck or over existing roofing such as roof shingles, in some instances adjacent and surrounding somewhat a roof edge; and
2. connecting the heating element to a heat source structure, and in certain embodiments, mounting the heat source structure, in some embodiments a heater cable, in mating passages in the heating element; and also in certain embodiments:
3. mounting and securing a cover panel to generally surround the heating element, and in some embodiments, extend over and/or under portions of the roof structure or otherwise beyond contact with the heating element.
4. if the heat source structure is electrical, connecting the heat source structure to a power supply.

In some embodiments, the method may include adding an insulating layer at desired locations on the heating element or to the underside of the cover panel. The insulating layer(s) may be mounted to the heating element locations either before mounting the heating element or during or after such mounting. The insulating layer(s) may be added to the underside of the cover panel at any point prior to mounting the cover panel to generally surround the heating element, depending on the nature of the insulating layer.

In some embodiments, the step of securing the heating element and/or cover panel to the roof may include inserting or otherwise utilizing an insulating washer or other insulating layer to be located between a metal fastener head and underlying structure on the heating element or cover panel with which the head will be in contact. Further, in some embodiments, fastener components or materials other than or in addition to screws or nails may be used. For example, construction adhesive may be utilized in certain applications to fasten one structure or component to another abutting the structure or component.

It can thus be seen that the heating apparatus embodiments of the type shown in FIGS. 3 and 4 can thus provide a more efficient, reliable, and easily manufactured, mounted, used, and maintained heating system than the prior art systems. The heating element provides substantially more heat transfer to the cover panel and substantially less heat transfer to the supporting roofing structure. The heating element also provides more rigidity and support strength than at least some prior art systems, such as the Bylin system, and the heating apparatus system provides substantially less exposure of the heating element associated fasteners and heat source structure to the elements and debris. When the heating apparatus includes insulating layers and washers between disparate metal surfaces that would otherwise be in contact with each other, the heating system also substantially reduces electrolysis (depending on the nature of the metals involved), extends life of the apparatus, and reduces the need for maintenance and renders maintenance easier as well since electrolysis, and resulting corrosion, can render components difficult to remove, etc.

Finally paint may applied to exposed surfaces of the heating apparatus, such as the upper surface of the cover panel, to achieve desired aesthetics. Metallic paint may be used to improve heat transfer through the paint.

As used herein, spatial or directional terms, such as "left," "right," "front," "back," and the like, relate to the subject matter as it is shown in the drawing figures. However, it is to be understood that the subject matter described herein may assume various alternative orientations and, accordingly, such terms are not to be considered as limiting. Furthermore, as used herein (i.e., in the claims and the specification), articles such as "the," "a," and "an" can connote the singular or plural. Also, as used herein, the word "or" when used without a preceding "either" (or other similar language indicating that "or" is unequivocally meant to be exclusive— e.g., only one of x or y, etc.) shall be interpreted to be inclusive (e.g., "x or y" means one or both x or y). Likewise, as used herein, the term "and/or" shall also be interpreted to be inclusive (e.g., "x and/or y" means one or both x or y). In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. The subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

What I claim is:

1. A roof structure heating apparatus comprising:

an elongated heating element mountable above an underlying roof structure and having:

(i) an upper heating panel;

(ii) at least a first heating cable channel extending along a lateral length of the heating element and downwardly from the upper heating panel; and (iii) a roof fastener support channel extending downwardly from the upper heating panel, wherein the roof fastener support channel has a roof fastener mounting wall:

(a) extending laterally between two opposed roof fastener mount support sections extending downwardly from the upper heating panel; and (b) connected to the two opposed roof fastener mount support sections and spaced from said upper heating panel at less than the depth of the first heating cable channel;

whereby the elongated heating element is mountable to abut theunderlying roof structure with (1) the roof fastener mounting wall spaced from the underlying roof structure and (2) a roof fastener extending downwardly through the roof fastener mounting wall into the underlying roof structure.

2. The roof structure heating apparatus of claim 1, wherein the elongated; heating element is mountable to the underlying roof structure with a plurality of roof fasteners penetrating the roof fastener mounting wall.

3. The roof structure heating apparatus of claim 1, wherein a lower supporting channel extends downwardly from a bottom side of the roof fastener mounting wall.

4. The roof structure heating apparatus of claim 1, further including a heatable cover section mountable to the upper heating panel opposite the underlying roof structure.

5. The roof structure heating apparatus of claim 1, wherein: (i) the heatable cover section includes a downwardly sloped cover edge lip; and (ii) the elongated, heating element additionally includes a cover support section and a heating element edge lip downwardly sloped from the cover support section and mountable adjacent the cover edge lip.

6. The roof structure apparatus of claim 1, further including at least a second heating cable channel extending downwardly from the upper heating panel.

7. The roof structure apparatus of claim 1, wherein the at least one among the first heating cable channel and second heating cable channel is supportingly mountable to the underlying roof structure.

8. The roof structure apparatus of claim 4 wherein the heatable cover section provides a cover panel abuttingly mountable to the upper heating panel.

9. The roof structure apparatus of claim 6 including at least a third heating cable channel extending downwardly from the upper heating panel.

10. The roof structure apparatus of claim 6 also including a heating cable mountable extending through the first heating cable channel and second heating cable channel.

11. The roof structure heating apparatus of claim 2 wherein the roof fastener mounting wall includes a second channel on a bottom side of the roof fastener mounting wall.

12. The roof structure heating apparatus of claim 11, further including a heatable cover section mountable to the upper heating panel opposite the underlying roof structure.

13. The roof structure heating apparatus of claim 11, wherein: (i) the heatable cover section includes a downwardly sloped cover edge lip; and (ii) the elongated, heating element additionally includes a cover support section and a heating element edge lip downwardly sloped from the cover support section and mountable adjacent the cover edge.

14. The roof structure apparatus of claim 13, further including at least a second heating cable channel extending downwardly from the upper heating panel.

15. The roof structure apparatus of claim 14, wherein the at least one heating cable channel is U-shaped in the cable channel wall.

16. The roof structure apparatus of claim 15 including at least a third heating cable channel extending downwardly from the upper heating panel.

17. The roof structure apparatus of claim 16 wherein the heatable cover section provides a cover panel abuttingly mountable to the upper heating panel.

18. The roof structure apparatus of claim 14 also including a heating cable mountable extending through the first heating cable channel and second heating cable channel.

19. The roof structure apparatus of claim 9 also including a heating cable mountable extending through the first heating cable channel, the second heating cable channel, and the third heating cable channel.

20. The roof structure apparatus of claim 17 also including a heating cable mountable extending through the first heating cable channel and second heating cable channel.

* * * * *